(12) United States Patent
Dumais et al.

(10) Patent No.: US 12,344,952 B2
(45) Date of Patent: Jul. 1, 2025

(54) AUTOMATED SYSTEMS, METHODS, AND TOOLS FOR HARVESTING ELECTRODEPOSITED METALS

(71) Applicants: Ionic Engineering Limited, Lively (CA); emew Corporation, Vancouver (CA)

(72) Inventors: Andre Dumais, Sudbury (CA); Paul Bazinet, Sudbury (CA); Michael Kehoe, Sudbury (CA); Chris Morgan, Sudbury (CA); Ian Ewart, Squamish (CA); Ajay Patel, Baroda (IN); William Gower, Toronto (CA)

(73) Assignees: IONIC ENGINEERING LIMITED, Lively (CA); EMEW CORPORATION, Vancouver (CA)

( * ) Notice: Subject to any disclaimer, the term of this patent is extended or adjusted under 35 U.S.C. 154(b) by 979 days.

(21) Appl. No.: 17/384,497

(22) Filed: Jul. 23, 2021

(65) Prior Publication Data

US 2022/0025536 A1    Jan. 27, 2022

Related U.S. Application Data

(60) Provisional application No. 63/056,831, filed on Jul. 27, 2020.

(51) Int. Cl.
*C25C 7/08*        (2006.01)
*B25J 9/16*        (2006.01)
(Continued)

(52) U.S. Cl.
CPC ............... *C25C 7/08* (2013.01); *B25J 9/1679* (2013.01); *B25J 11/005* (2013.01); *B25J 15/0616* (2013.01); *B25J 19/02* (2013.01)

(58) Field of Classification Search
CPC ......... C25C 7/08; B25J 9/1679; B25J 11/005; B25J 15/0616; B25J 19/02; B25J 11/00; B25J 15/00
See application file for complete search history.

(56) References Cited

U.S. PATENT DOCUMENTS 3,052,611 A * 9/1962 Piper ........................ C25C 3/34
                                                     205/47
4,840,710 A * 6/1989 Middlin .................... C25C 7/08
                                                    156/701
(Continued)

OTHER PUBLICATIONS

Emew Clean Technologies, Harvesting Procedure; Apr. 15, 2019 (Year: 2019).*

(Continued)

*Primary Examiner* — Patrick H Mackey
(74) *Attorney, Agent, or Firm* — STETINA GARRED BRUCKER & NEWBOLES

(57) ABSTRACT

Automated robotic harvesting systems and methods for harvesting electrodeposited metals from a cell, and specialized end of arm tooling for use in automated robotic harvesting systems and methods for harvesting electrodeposited metals from a cell, are disclosed. A harvesting tool comprises an extraction gripping unit configured to extract a starter sheet and metal electrodeposited on the starter sheet from a cell, and a harvesting gripping unit configured to separate the starter sheet from the metal for harvesting the metal.

19 Claims, 12 Drawing Sheets

(51) Int. Cl.
  *B25J 11/00* (2006.01)
  *B25J 15/06* (2006.01)
  *B25J 19/02* (2006.01)

(56) References Cited

U.S. PATENT DOCUMENTS

| | | | | |
|---|---|---|---|---|
| 5,290,412 | A * | 3/1994 | Saito | C25C 7/08 |
| | | | | 204/279 |
| 10,301,729 | B2 * | 5/2019 | Willit | G21C 19/42 |
| 10,550,489 | B2 * | 2/2020 | Willit | C25C 7/06 |
| 2007/0152616 | A1 * | 7/2007 | Salamanca | B25J 9/0093 |
| | | | | 318/568.11 |
| 2016/0060779 | A1 * | 3/2016 | Baird | C25C 1/12 |
| | | | | 204/242 |

OTHER PUBLICATIONS

Emew Clean Technologies, Harvesting Procedure, date Apr. 15, 2019, 10 pages.
Emew Clean Technologies, Harvesting Procedure, Video Reference—Harvesting Video no HV-01, date Apr. 15, 2019.
Emew Clean Technologies, Harvesting Procedure, Video Reference—Harvesting Video no HV-02, date Apr. 15, 2019.

* cited by examiner

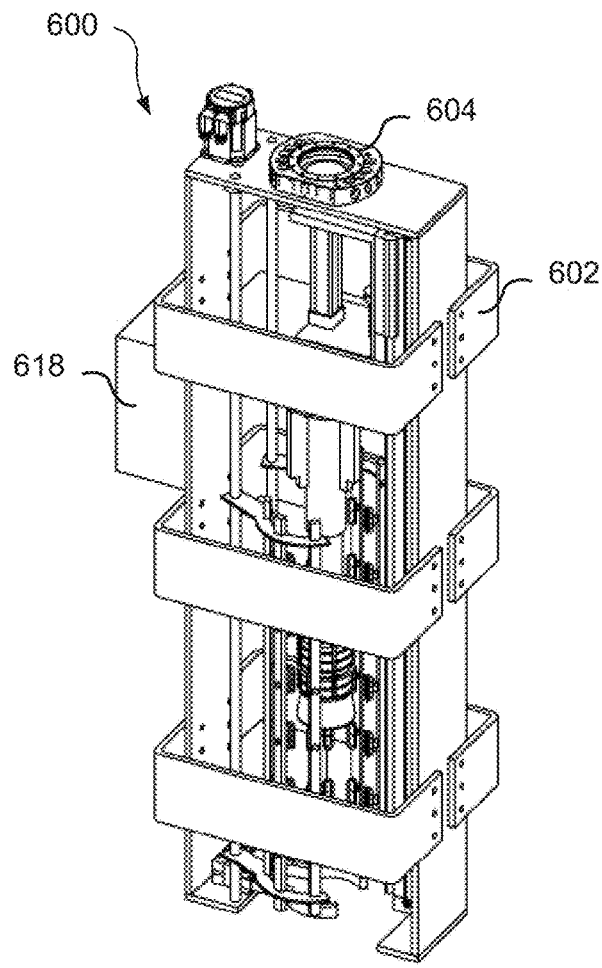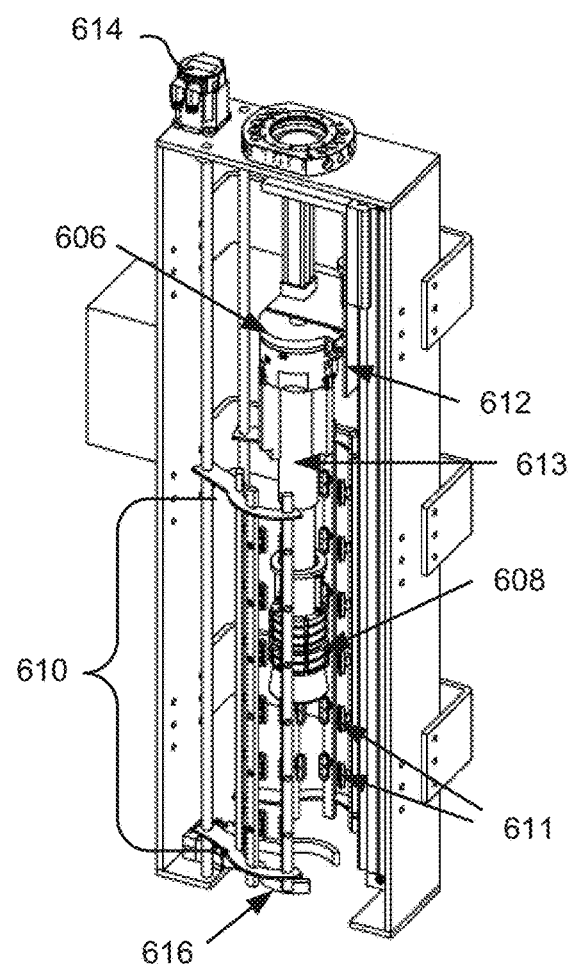
*FIG. 6A*  *FIG. 6B*

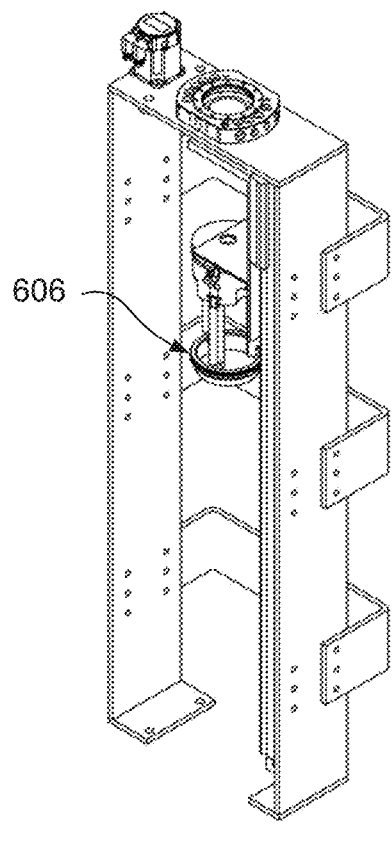
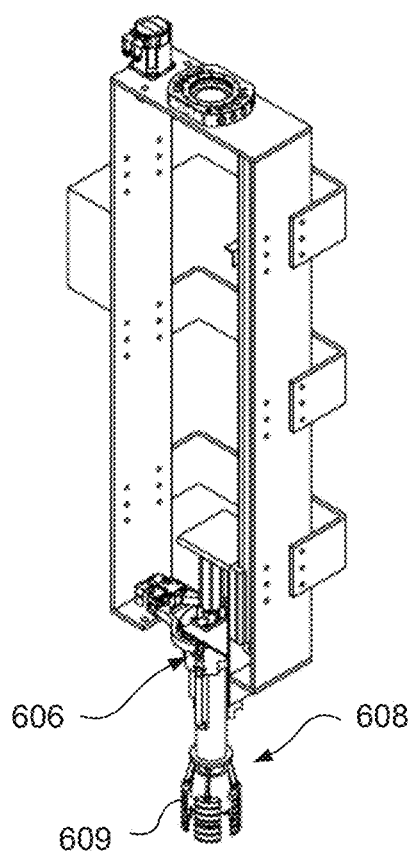
*FIG. 6C*  *FIG. 6D*

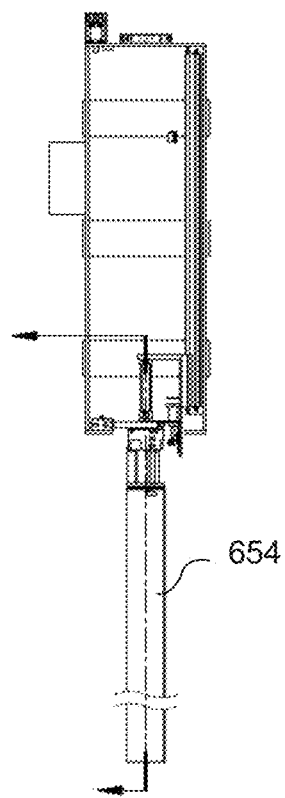 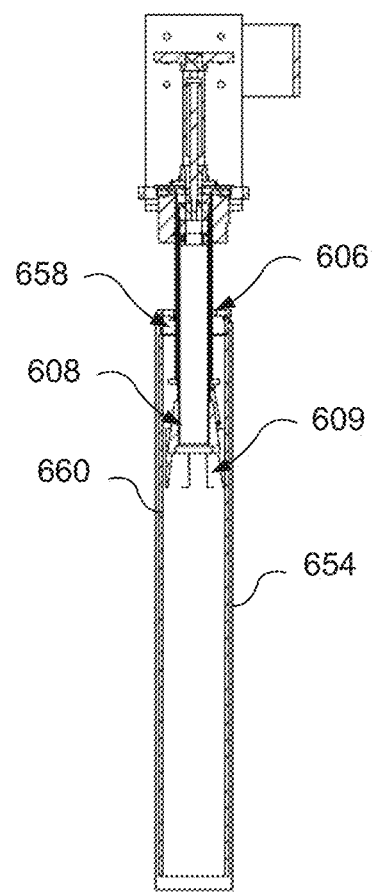
FIG. 6E  FIG. 6F

AUTOMATED SYSTEMS, METHODS, AND TOOLS FOR HARVESTING ELECTRODEPOSITED METALS

CROSS-REFERENCE TO RELATED APPLICATIONS

This application claims priority to U.S. Provisional Patent Application No. 63/056,831, filed on Jul. 27, 2020, the entire contents of which is incorporated herein by reference for all purposes.

BACKGROUND

Technical Field

The present disclosure relates to harvesting electrodeposited metals and in particular to automated systems, methods, and tooling.

Background

Electrowinning and other electrolytic processes may occur within long cylindrical tubes referred to as cells (in particular, "vortex cells"). Cells comprise an anode permanently installed in the middle of the cell and a replaceable starter sheet placed on the outer diameter of the cell. Electrolyte is circulated through the cell from bottom to top which produces metal (e.g. copper, tin, cobalt, nickel, etc.) growth onto the starter sheet. A masking ring prevents flow along the top of the starter sheet to ensure no growth over the sheet edge occurs. A cap both locates the anode and is used to prevent the escape of acidic fumes and spillage of electrolyte solution during the plating cycle.

Harvesting metals produced in the cells is primarily a manual process. Cellhouses that comprise the cells may vary in size, but generally cells are arranged in modules of 90 cells, comprising three groupings of 30 cells (corresponding to one frame), each frame comprising two banks (rows) of 15 cells. To harvest the electrodeposited metals from the cells in the cellhouse, a module of cells is first manually isolated both mechanically and electrically. Operators then use a custom cap wrench tool for manually removing (and later reinstalling) cell caps. The electrodeposited metal, starter sheet, and masking ring removal is completed using a manual harvester which is moved from cell to cell via overhead hoist. The metal is then dropped off in unloading racks, brought to a rinse tank and prepared for shipping. Once the metal is removed operators reinsert the starter sheet, masking ring, and reinstall the cell cap.

Existing harvesting operations are thus a manual- and time-intensive process. Though an overhead hoist may be used to carry the weight of the metal tubes, the process can be physically taxing and ergonomically challenging over the duration of a harvesting cycle. For larger installations, multiple workers are required to keep up with the plating and harvesting cycles. Additionally, operators must consistently walk back and forth from the cell to the drop off rack for each metal tube being harvested. Workers are also exposed to electrolyte solution during the harvesting procedure which can be a safety concern. Other safety concerns include operators lifting starter sheets, and risks of hand injuries during the harvesting process.

Accordingly, systems, methods, and tools that enable automation in the harvesting of electrodeposited metals remain highly desirable.

BRIEF DESCRIPTION OF THE DRAWINGS

Features and advantages of the present disclosure will become apparent from the following detailed description, taken in combination with the appended drawings, in which:

FIGS. 6A and 6B show an example of a harvesting tool for the automated robotic harvesting system;

FIGS. 6C-F show details of an extraction gripping unit in the harvesting tool of FIGS. 6A and 6B;

It will be noted that throughout the appended drawings, like features are identified by like reference numerals.

DETAILED DESCRIPTION

Figures 1A, 1B:
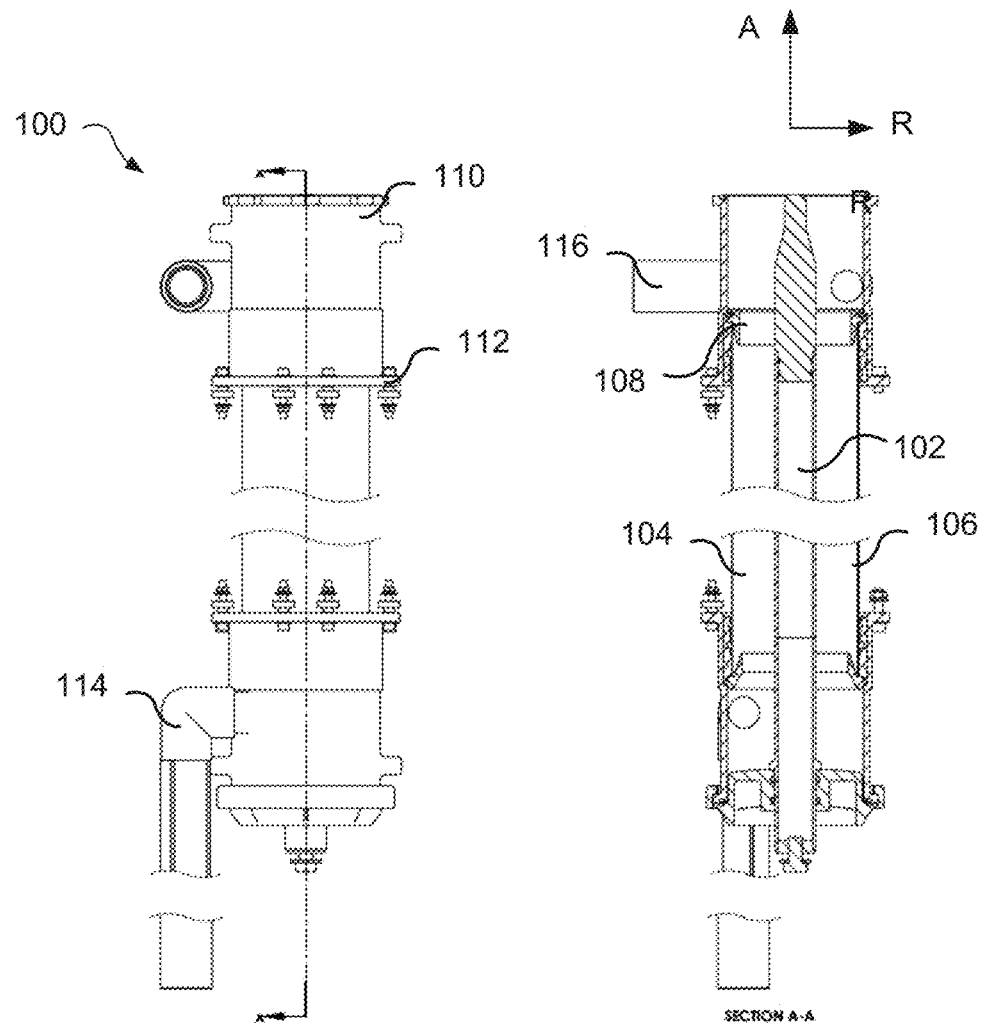
FIGS. 1A and 1B show a representation of a conventional cell assembly used in a vortex electrowinning process.

In accordance with one aspect of the present disclosure a harvesting tool is disclosed for harvesting electrodeposited metals from a cell comprising a tubular cell wall, an anode extending in an axial direction of the cell and disposed centrally within the cell with respect to a radial direction of the cell, a removable starter sheet disposed along an inner surface of the cell wall, and a masking ring arranged on top of the starter sheet, the harvesting tool comprising: an extraction gripping unit configured to extract the starter sheet and metal electrodeposited on an interior surface of the starter sheet from the cell; a harvesting gripping unit configured to separate the metal and the starter sheet; a first actuator coupled to the extraction gripping unit, configured to move the extraction gripping unit between: an insertion position, wherein the extraction gripping unit is inserted to a position inside the cell, and an extracted position, wherein the extraction gripping unit is positioned outside the cell; and a second actuator coupled to the harvesting gripping unit, configured to move the harvesting gripping unit between: a starter sheet gripping position, wherein the harvesting gripping unit is configured to grip the starter sheet, and a separation position, wherein the starter sheet is separated from the metal.

In some aspects, the extraction gripping unit is actuatable to an extraction gripping position to grip at least one of the masking ring of the cell, and the metal electrodeposited on the starter sheet.

In some aspects, the extraction gripping unit comprises: a first gripping unit configured to grip the masking ring of the cell; and a second gripping unit configured to grip the metal, wherein in the insertion position, the first gripping unit is inserted to a position of the masking ring, and the second gripping unit is positioned inside the cell between the anode and the metal.

In some aspects, the first gripping unit is actuatable to a first extraction gripping position to grip the masking ring.

In some aspects, the first gripping unit comprises an internal diameter gripper having fingers that can be actuated outwardly to grip an internal diameter of the masking ring.

In some aspects, the masking ring is rotationally locked with the starter sheet, and wherein the harvesting tool further comprises a rotational actuator coupled to the first gripping unit and configured to rotate the first gripping unit in the first gripping position to separate the masking ring from the starter sheet.

In some aspects, the second gripping unit is actuatable to a second extraction gripping position to grip an inner surface of the metal.

In some aspects, the second gripping unit comprises a plurality of pneumatically-actuated barbed edges that expand outwards when actuated to grip the inner surface of the metal.

In some aspects, the harvesting gripping unit comprises two or more suction cups arranged circumferentially around an external surface of the starter sheet when the starter sheet is removed from the cell and the extraction gripping unit is in the extracted position, and wherein the two or more suction cups are actuatable between the starter sheet gripping position and the separation position.

In some aspects, the harvesting tool further comprises a force-imparting device actuatable to impart a force to the starter sheet to facilitate separation of the starter sheet from the metal.

In some aspects, the harvesting tool further comprises a sensor configured to detect the separation of the starter sheet from the metal tube and to communicate separation data recorded by the sensor.

In some aspects, the harvesting tool further comprises a locating sensor configured to locate a seam of the starter sheet prior to removal of the starter sheet from the cell, and to communicate seam location data recorded by the sensor, wherein the seam location data is used to align the harvesting gripping unit relative to the seam.

In some aspects, the harvesting tool further comprises a clamping apparatus configured to be actuated to reduce a diameter of the starter sheet for reinsertion of the starter sheet into the cell.

In some aspects, the first actuator is configured to move the extraction gripping unit in the axial direction of the cell between the insertion position and the extracted position.

In some aspects, the second actuator is configured to move the harvesting gripping unit in the radial direction of the cell between the starter sheet gripping position and the separation position.

In some aspects, the harvesting tool further comprises a tool changer for coupling to a robotic arm.

In accordance with another aspect of the present disclosure a harvesting system is disclosed for harvesting electrodeposited metals from a cell comprising a tubular cell wall, an anode extending in an axial direction of the cell and disposed centrally within the cell with respect to a radial direction of the cell, a removable starter sheet disposed along an inner surface of the cell wall, and a masking ring arranged on top of the starter sheet, the harvesting system comprising: a harvesting tool, comprising: an extraction gripping unit configured to extract the starter sheet and metal electrodeposited on an interior surface of the starter sheet from the cell; a harvesting gripping unit configured to separate the metal and the starter sheet; a first actuator coupled to the extraction gripping unit, configured to move the extraction gripping unit between: an insertion position, wherein the extraction gripping unit is inserted to a position inside the cell, and an extracted position, wherein the extraction gripping unit is positioned outside the cell; and a second actuator coupled to the harvesting gripping unit, configured to move the harvesting gripping unit between: a starter sheet gripping position, wherein the harvesting gripping unit is configured to grip the starter sheet, and a separation position, wherein the starter sheet is separated from the metal; a robotic arm configured to couple to the harvesting tool; and a controller configured to control movement of the robotic arm and to control actuation of the harvesting tool.

In some aspects, the harvesting system further comprises: a gantry extending in a first direction and configured to travel linearly in a second direction perpendicular to the first direction, the gantry comprising a robotic track arranged thereon; and a robotic slide unit arranged on the robotic track of the gantry and configured to travel along the robotic track in the first direction; wherein the robotic arm is arranged on the robotic slide unit.

In some aspects, the harvesting system further comprises a cap tool configured to be coupled to the robotic arm, the cap tool comprising a cap gripping unit configured to grip a cell cap of the cell, and wherein the robotic arm is configured to rotate the cap tool to remove and reinstall the cell cap.

In accordance with another aspect of the present disclosure a method of harvesting electrodeposited metal from a cell is disclosed, the cell comprising a tubular cell wall, an anode extending in an axial direction of the cell and disposed centrally within the cell with respect to a radial direction of the cell, a removable starter sheet disposed along an inner surface of the cell wall, and a masking ring arranged on top of the starter sheet, the method comprising: aligning a harvesting tool over the cell, the harvesting tool comprising: an extraction gripping unit configured to extract the starter sheet and metal electrodeposited on an interior surface of the starter sheet from the cell; a harvesting gripping unit configured to separate the metal and the starter sheet; a first actuator coupled to the extraction gripping unit, configured to move the extraction gripping unit between: an insertion position, wherein the extraction gripping unit is inserted to a position inside the cell, and an extracted position, wherein the extraction gripping unit is positioned outside the cell; and a second actuator coupled to the harvesting gripping unit, configured to move the harvesting gripping unit between: a starter sheet gripping position, wherein the harvesting gripping unit is configured to grip the starter sheet, and a separation position, wherein the starter sheet is separated from the metal; actuating the extraction gripping unit to the insertion position; actuating the extraction gripping unit to an extraction gripping position to grip at least one of the masking ring of the cell, and the metal electrodeposited on the starter sheet; with the extraction gripping unit in the extraction gripping position, actuating the extraction gripping unit to the extracted position, wherein the extraction gripping unit is positioned outside the cell and the masking ring, the metal, and the starter sheet are removed from the cell; and with the extraction gripping unit in the extracted position, actuating the harvesting gripping unit to the starter sheet gripping position to grip the starter sheet, and subsequently actuating the harvesting gripping unit to the separation position, to separate the metal from the starter sheet.

In accordance with another aspect of the present disclosure, a cell for electrodepositing metals is disclosed, comprising: a tubular cell wall; an anode extending in an axial direction of the cell and disposed centrally within the cell with respect to a radial direction of the cell; a starter sheet disposed along an inner surface of the cell wall; and a masking ring arranged on top of the starter sheet, wherein the starter sheet comprises a locking tab mount and the masking ring comprises a protrusion for rotationally engaging with the locking tab mount of the starter sheet to lock the masking ring to the starter sheet.

The present disclosure describes automated robotic harvesting systems and methods for harvesting electrodeposited metals from a vortex electrowinning cell, and specialized end of arm tooling for use in automated robotic harvesting systems and methods for harvesting electrodeposited metals from a vortex electrowinning cell. The automated robotic harvesting systems and methods utilizing the end of arm tooling as disclosed herein are, among other things, able to reduce the existing harvesting cycle time; are adaptable to both brown field and green field installations with minimal costs/changes to existing cell designs and plant designs; provides reliable and repeatable automated harvesting with minimal downtime; provides high precision capabilities to accurately locate and harvest all cell positions within the tankhouse; requires minimal operator interactions; and helps to provide enhanced operator safety.

Embodiments are described below, by way of example only, with reference to FIGS. 1-8.

FIGS. 1A and 1B shows a representation of a conventional vortex electrowinning cell 100 used in an electrowinning process. Specifically, FIG. 1A shows an elevation view of the cell 100 and FIG. 1B shows a cross-sectional view of the cell. The cell 100 comprises an anode 102 installed extending in an axial direction A of the cell and disposed centrally within the cell with respect to a radial direction R of the cell 100, and a replaceable/removable starter sheet 104 disposed along an inner surface of cell wall 106. A masking ring 108 is arranged to prevent flow of electrolyte along a top of the starter sheet 104, and a cell cap 110 encloses an opening at the top of the cell wall 106 to prevent the escape of acidic fumes and spillage of electrolyte solution during the plating cycle. The cell cap 110 is configured to be removable from the cell wall 106. For example, the cell cap 110 may be joined to the cell wall 106 using a mechanical adapter 112 arranged at an upper end of the cell wall 106. The mechanical adapter 112 may for example provide a threaded joint that allows for screwing the cell cap 110 into the threaded joint. An O-ring may be utilized in the mechanical adapter 112 to provide a seal between the cell wall 106 and the cell cap 110 to ensure that electrolyte is sealed within the cell and that no leaks occur. An inlet port 114 is coupled to a bottom end of the cell 100 and an outlet port 116 is coupled to the cell cap 110 for flow of electrolyte solution.

As previously described, the current process for harvesting metals deposited on the cathode is primarily a manual process. The present disclosure describes automated harvesting systems and methods utilizing a robotic system with specialized end of arm tooling for performing the harvesting process. The automated harvesting system and robotic tooling disclosed herein is advantageously configured to function with existing plant layouts and cell designs, and is thus readily adaptable for use not only in green-field installations but also in brown-field applications with minimal changes to cell and plant designs.

While the robotic systems and tooling disclosed herein for automated harvesting may be used to harvest metals from conventional cells such as cell 100 shown in FIG. 1, modifications may also be made to the cell design to improve compatibility with the robotic systems disclosed herein. For example, the existing upper body of the cell 100 typically has an O-ring which sits freely in a recessed groove and is used to seal against the cell cap 110. During the existing manual harvesting process, this O-ring can become displaced from the upper body during removal process but is easily reinstalled by a worker. To facilitate harvesting using a robotic system, a design change to the cell cap or upper body may be made to have the O-ring recessed into the cap to prevent/mitigate the cell cap from being displaced. Further, since periodic greasing of the O-ring helps to mitigate O-ring damage and ensure consistent torque requirements during cap removal and installation, an automated grease dispenser may be integrated in the robotic tools disclosed herein.

As another example of a modification that may be made to the cell design to facilitate harvesting using a robotic system, during the harvesting process, specifically the metal extraction from the cell, the starter sheet may occasionally get caught in the cell due to the friction force between the cell wall and the starter sheet. Slippage of the metal and starter sheet is problematic from a part tracking perspective as the robot would need to detect slippage to avoid potential part collision. To mitigate this potential problem, the masking ring and starter sheet may be modified to include locking tabs and corresponding slotted connections to ensure that the starter sheet, metal, and masking ring are extracted from the cell as one package with no slipping.

Figure 2A:
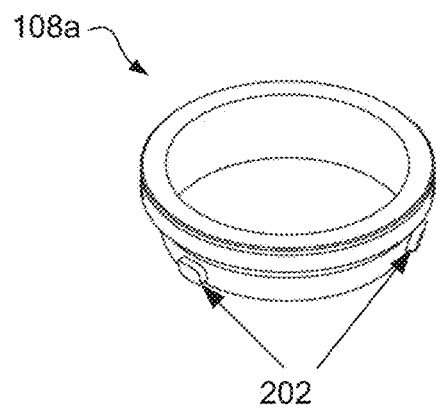
FIGS. 2A-D show a modification to the cell assembly to facilitate use of a harvesting tool.
Figure 2B:
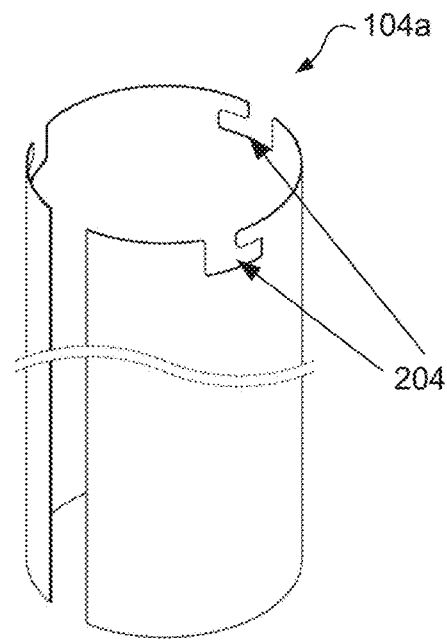
Figure 2C:
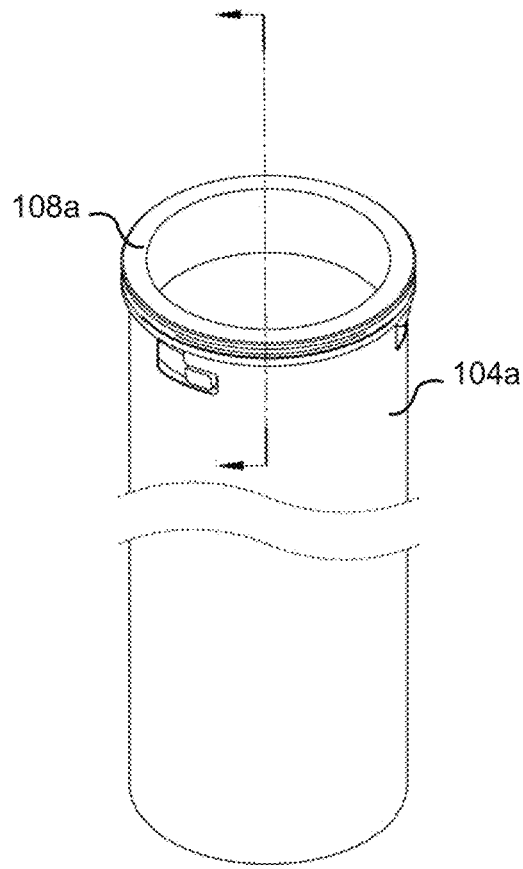
Figure 2D:
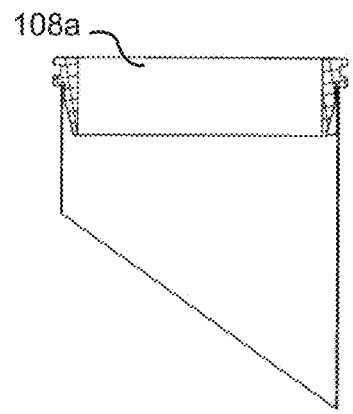

FIGS. 2A-D show a modification to the masking ring and starter sheet in the cell assembly. In this example, the masking ring 108a and starter sheet 104a are modified to create a bayonet-style locking mount that rotationally locks the masking ring 108a and the starter sheet 104a. FIG. 2A shows the masking ring 108a modified to include a protrusion or male bayonet 202. FIG. 2B shows the starter sheet 104a modified to include locking tab mounts 204. FIG. 2C shows the masking ring 108a fitted into the starter sheet 104a, with the male bayonet 202 inserted into the locking tab mount 204 and twisted to secure the masking ring 108a and starter sheet 104a together. The plating line for the metal, which may be controlled by the o-ring on the masking ring, should be below the locking tab mounts 204, as shown in FIG. 2D.

Figure 3:
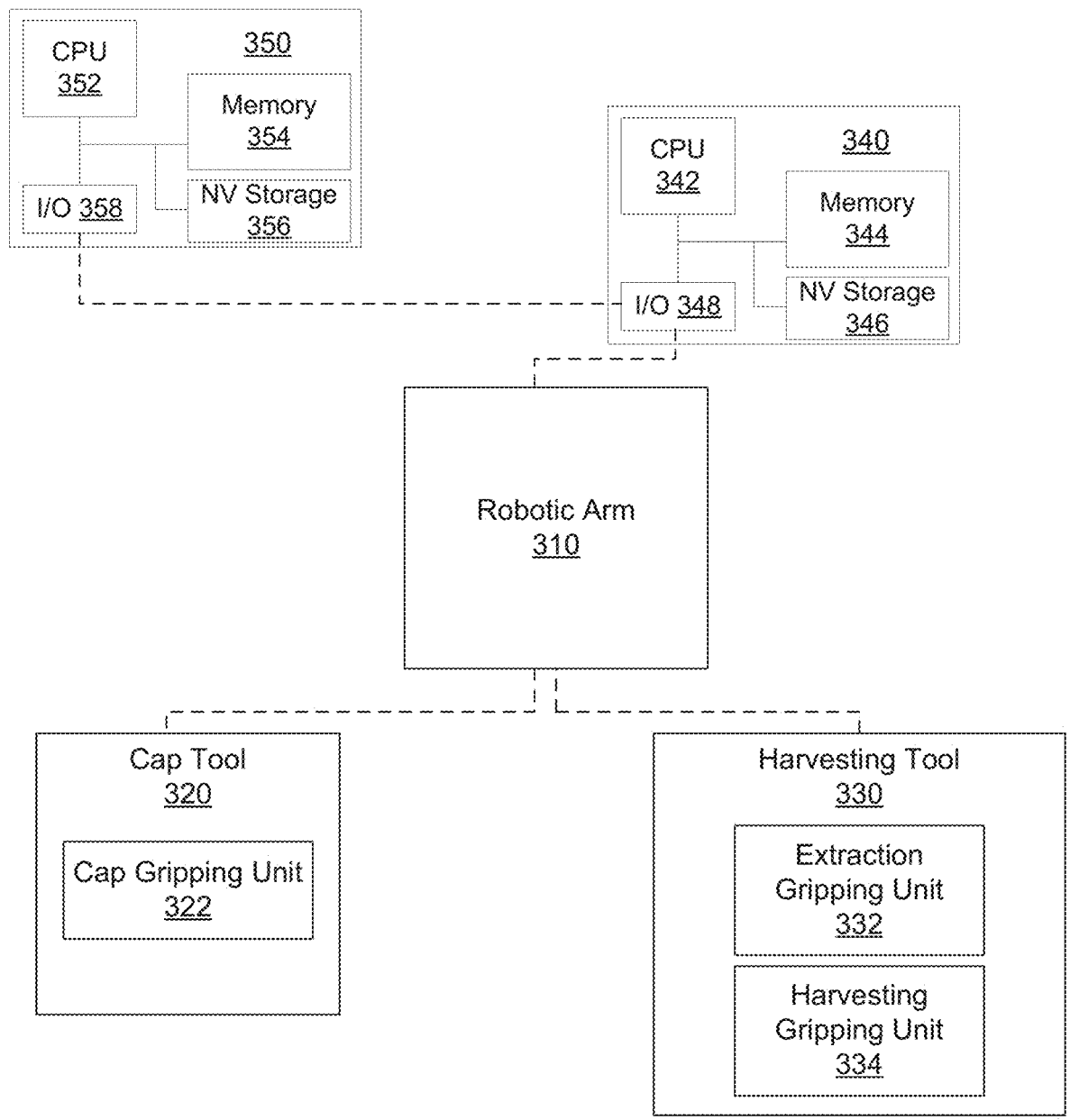
FIG. 3 shows a representation of an automated robotic harvesting system.

FIG. 3 shows a representation of an automated robotic harvesting system. The automated robotic harvesting system is configured to harvest electrodeposited metals from one or more cells. The automated robotic harvesting system may be configured to harvest electrodeposited metals from conventional vortex electrowinning cells, such as the cell 100 shown in FIG. 1, and/or from modified cells, such as cells having a modification as described with reference to FIGS. 2A-D.

The automated robotic harvesting system comprises a robotic arm 310, which may for example be a 6-axis robot arm. The robotic arm 310 may be movable to various cell locations in a cellhouse to position the robotic arm 310 relative to a cell to be harvested. The robotic arm 310 is configured to be coupled to end of arm tooling for performing a harvesting process, such as via robotic tool changers.

In particular, the present disclosure describes two end of arm tools that may be utilized by the robotic arm 310. A first tool is a cap tool 320, which comprises a cap gripping unit 322 that is configured to grip a cell cap for removal of the cell cap from the cell to permit harvesting of the metal deposited in the cell and for reinstallation of the cell cap after the metal has been harvested from the cell. An example of a cap tool 320 is provided with reference to FIG. 5 below.

A second tool is a harvesting tool 330, which comprises an extraction gripping unit 332 configured to extract the electrodeposited metal and the starter sheet from the cell, and a harvesting gripping unit 334 configured to separate the starter sheet from the electrodeposited metal so that the metal may be harvested. The harvesting tool 330 is also configured to reinstall the starter sheet in the cell after the metal has been harvested, using one or both of the extraction gripping unit 332 and the harvesting gripping unit 334. An example of a harvesting tool 330 is provided with reference to FIGS. 6A and 6B below.

The automated robotic harvesting system further comprises a central controller 350 that is in communication with a robotic controller 340 via the I/O interface and is configured to control the robotic arm 310 and the end of arm tooling coupled to the robotic arm 310 (i.e. the cap tool 320 and the harvesting tool 330 when coupled to the robotic arm 310). The central controller 350 may for example be a local programmable logic controller (PLC), and comprises computer elements including a processing unit, which is depicted in FIG. 3 as a CPU 352 though it may be a microprocessor, application specific integrated circuit, field programmable gate array, etc., a non-transitory computer-readable memory 354, non-volatile storage 356, and an input/output (I/O) interface 358. The memory 354 stores computer-readable instructions that, when executed by the processing unit, configure the controller 350 to perform certain functionality for controlling the robotic arm 310 and end of arm tooling for harvesting electrodeposited metals as disclosed herein. The I/O interface 358 may provide an HMI (Human-Machine Interface) that allows users to control start/stop of the automated harvesting and provides system feedback (i.e. machine status, alarms, faults, etc.). The I/O interface 358 may also be configured to provide for communication between the controller 350 and the robotic controller 340, such as via Ethernet, to send commands to control the robotic arm 310 and end of arm tooling and to receive data therefrom. In some implementations, the I/O interface 358 may also be configured to communicate directly with the end of arm tooling.

The robotic controller 340 may similarly comprise a processing unit, which is depicted in FIG. 3 as a CPU 342 though it may be a microprocessor, application specific integrated circuit, field programmable gate array, etc., a non-transitory computer-readable memory 344, non-volatile storage 346, and an input/output (I/O) interface 348. The memory 344 stores computer-readable instructions that, when executed by the processing unit, configure the robotic controller 340 to perform certain functionality for controlling the robotic arm 310 and end of arm tooling for harvesting electrodeposited metals. The I/O interface 348 may be configured to communicate with the controller 350, such as to receive commands to move/control the robotic arm 310 and/or the cap tool 320 and the harvesting tool 330 when coupled to the robotic arm 310, and to send data back to the controller 350.

Figure 4:
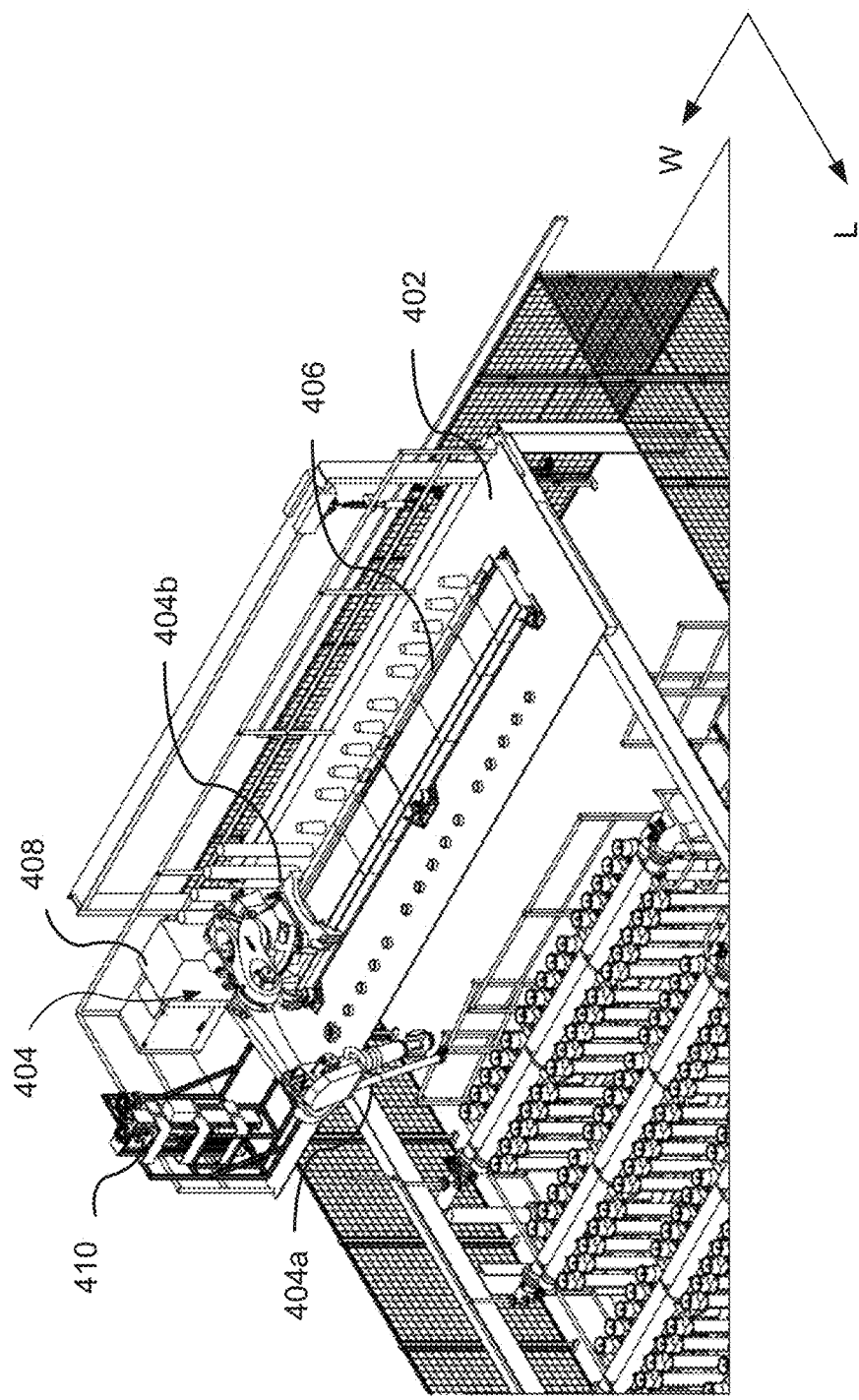
FIG. 4 shows an example of an automated robotic harvesting system.

FIG. 4 shows an example of an automated robotic harvesting system. To facilitate movement of the robotic arm to access all cells in an installation, a servo driven overhead gantry system may be used. The automated robotic harvesting system shown in FIG. 4 comprises an overhead gantry 402 and a robotic system 404. This gantry 402 allows the robotic system 404 to move along a first direction (e.g. a length direction L) of the cellhouse and reach all frames. Total gantry travel length can be adjusted depending on the overall number of modules within the cellhouse. The gantry structure may comprise support beams and two runway beams on each end of the plant, and may further comprise an area to temporarily store cell caps and starter sheet assemblies as they are being harvested.

The robotic system 404 comprises a 6-axis robot arm 404a coupled with a 7th axis robotic slide unit 404b mounted on the gantry 402 that allows the robot to travel in a second direction perpendicular to the first direction (e.g. a width-wise direction W) to reach all cells within a frame. The robot arm 404a is mounted on the 7th axis robotic slide unit 404b which allows the robot arm 404a to traverse along a guided robotic track 406 on the gantry 402. Thus, the overhead gantry 402 is configured to move along the runway beams to travel a length of the cellhouse, and the robotic system 404 is configured to travel along a length of the gantry 402 via the track 406 to reach different cells in a width direction within a frame.

A robotic controller 408 is used to control the 6-axis robot arm 404a and any tools attached to the robot arm 404a such as the cap tool and harvesting tool described with reference to FIG. 3, and may also be configured to control the 7th axis robotic slide unit 404b, and the overhead gantry 402 running the length of the plant.

Cell locations may be individually stored in memory or non-volatile storage of the robotic controller 408 to ensure positional accuracy. Repeatable positioning of the end of arm tools with respect to cell locations is readily achievable through the use of the robotic arm 404a. The automated harvesting system may further comprise position feedback sensors (not shown) on the main overhead gantry 402 and/or the 7th axis robotic slide unit 404b, which may communicate data to the robotic controller 408 to further allow the controller 408 to ensure positional accuracy.

As described with reference to FIG. 3, the automated harvesting system may be controlled via a central controller such as a local programmable logic controller (PLC) in communication with the robotic controller 408. An HMI (Human-Machine Interface) may allow users to control start/stop of the automated harvesting and provides system feedback (i.e. machine status, alarms, faults, etc.). The HMI may also provide manual control of the gantry system for maintenance purposes, etc. Position feedback and part present sensors may be used throughout the system to ensure position and part tracking are accurate and constant.

As described with reference to FIG. 3, the automated harvesting system is configured to utilize end of arm tools that couple to the end of the robotic arm 404a to accomplish the harvesting process. The tools may be stored for example in a tool rack 410 on the gantry platform when not in use.

Figure 5:
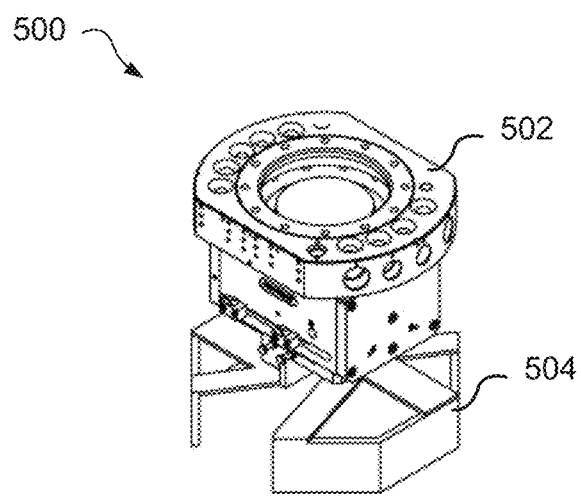
FIG. 5 shows an example of a cap tool for the automated robotic harvesting system.

FIG. 5 shows an example of a cap tool 500 for the automated robotic harvesting system. The cap tool 500 may for example be used in the robotic system of FIG. 4, though it will be appreciated that the cap tool 500 may be used with other robotic systems, such as with a stand-alone robotic arm arranged to harvest metals from cells in a system that differs from that described with reference to FIG. 4. The cap tool 500 tool comprises a tool changer 502 at a first end thereof for being coupled to the end of a robotic arm, and a cap gripping unit 504 such as a pneumatic gripper at a second end thereof configured to grab hold of the cell cap. The robot arm may be controlled to twist the A6 axis (wrist) while the cap tool 500 is gripping the cap with the pneumatic gripper 504 to loosen and tighten the cell cap during removal and reinstallation. Cell caps that have been removed may be placed on a holder (e.g. located on the gantry) until it is needed for installation.

The twisting motion to remove the cell cap requires significant torque from the robot arm. The cap tool 500 should have a significant grip on the cap to prevent slippage. In some implementations, the robot arm may use a combination of different axes to apply torque to remove the cap.

Implementation of an automated greasing system (not shown) in the cap tool may also aid in ensuring consistent removal force. Providing a downward force on the cell cap during removal may also help reduce the torque required. This downward force on the cap increases the normal force on the O-ring while reducing the normal force between retaining hooks and the upper end body, which may reduce the total torque required for removal.

FIGS. 6A and 6B show an example of a harvesting tool 600 for the automated robotic harvesting system. The harvesting tool 600 may for example be used in the robotic system of FIG. 4, though it will be appreciated that the harvesting tool 600 may be used with other robotic systems, such as with a stand-alone robotic arm arranged to harvest metals from cells in a system that differs from that described with reference to FIG. 4. FIG. 6A shows an assembled view of the harvesting tool 600, and FIG. 6B shows the harvesting tool with a front portion of the frame removed to more clearly show the internal components of the harvesting tool. Due to the corrosiveness of the electrolyte in the cell, the harvesting tool 600 may be primarily fabricated from materials such as stainless steel.

As shown in FIG. 6A, the harvesting tool 600 may comprise a frame 602 enclosing the internal components. The harvesting tool 600 is configured to be coupled to an end of the robotic arm, and may comprise a tool changer 604 for coupling to the robotic arm. The tool changer 604 located atop of the frame 602 allows the robot to quickly change between the cap tool 500 and the harvesting tool 600, while maintaining accurate positioning. A junction box 618 may be provided for supplying electrical power and compressed air to actuate components of the harvesting tool 600, and the junction box 618 may be coupled to a controller via a multiconductor wire, for example.

As previously described with reference to FIG. 3, the harvesting tool comprises an extraction gripping unit and a harvesting gripping unit. The extraction gripping unit is configured to extract the starter sheet and metal electrodeposited on an interior surface of the starter sheet from the cell, and may be configured to grip at least one of the masking ring of the cell, and/or the electrodeposited metal on the starter sheet. The harvesting gripping unit is configured to separate the metal and the starter sheet. FIGS. 6C-F show details of an extraction gripping unit in the harvesting tool of FIGS. 6A and 6B, and FIGS. 6G-I show details of a harvesting gripping unit in the harvesting tool of FIGS. 6A and 6B.

In the example of FIGS. 6A and 6B, the harvesting tool 600 comprises a first gripping unit 606, a second gripping unit 608, and a third gripping unit 610, each configured for gripping elements of the cell during the harvesting process. Each of the first gripping unit 606, the second gripping unit 608, and the third gripping unit 610, may be mechanically coupled, either directly or indirectly, to the frame 602, and the mechanical coupling allows for the gripping units to be actuatable in one or more directions by linear motion, rotational motion, and/or a combination thereof. As discussed in more detail below, the first gripping unit 606 is configured to grip a masking ring of the cell, the second gripping unit 608 is configured to grip a metal tube that has been electrodeposited on an interior surface of the starter sheet, and the third gripping unit 610 is configured to grip the starter sheet and to separate the starter sheet from the metal tube. In the context of FIG. 3, the first and second gripping units 606, 608 shown in FIG. 6 may correspond to the extraction gripping unit 332, and the third gripping unit 610 may correspond to the harvesting gripping unit 334.

FIG. 6C shows the first gripping unit 606 in isolation without the second gripping unit 608 or third gripping unit 610 present in the figure; FIG. 6D shows the first gripping unit 606 and the second gripping unit 608 in a position extending downwardly from the harvesting tool 600 to allow the first gripping unit 606 and the second gripping unit 608 to be inserted into a cell and to grip elements of the cell, as described in more detail below; FIG. 6E shows the first gripping unit 606 and the second gripping unit 608 in an extraction gripping position gripping the masking ring and the electrodeposited metal from the cell; and FIG. 6F shows a cross-sectional view of FIG. 6E. The first gripping unit 606 may be arranged at an upper end portion of the harvesting tool 600, and the second gripping unit 608 may extend vertically in an axial direction of the cell and may be coupled to a lower end of the first gripping unit 606.

The harvesting tool 600 comprises at least one actuator coupled to the extraction gripping unit, i.e. the first and second gripping units 606 and 608. In FIG. 6B, actuator 612 is coupled to an actuating rod 613, which has the second gripping unit 608 coupled to a lower end thereof, and the first gripping unit 606 coupled to the actuating rod 613 above the second gripping unit 608. The actuator 612 may for example be a pneumatic linear actuator such as a rodless cylinder that is actuated with compressed air supplied to the harvesting tool 600. The actuator 612 may be configured to move along a side interior surface of the frame 602 in an up-down direction, thus causing the actuating rod 613 to move the first and second gripping units 606, 608 vertically in the axial direction of the cell between an insertion position whereby the first and second gripping units are extended below the frame 602 of the harvesting tool 600 (as for example shown in FIG. 6D) for insertion into the cell, and an extracted position whereby the first and second gripping units are outside of the cell and allow for separation of the starter sheet and the electrodeposited metal. FIG. 6B shows the first and second gripping units 606, 608 in the extracted position.

In operation, with the harvesting tool 600 positioned above the cell having its cell cap removed, the actuator 612 is controlled to move the first and second gripping units 606, 608 downwardly to the insertion position, wherein the first gripping unit 606 is inserted to a position of the masking ring of the cell and the second gripping unit 608 is disposed inside the cell radially outward of the anode (i.e. between the anode and the electrodeposited metal/starter sheet). As shown for example in FIGS. 6D and 6F, the second gripping unit 608 may be in the form of a tube having a hollow interior so as to slide over the anode and extend circumferentially around the anode. Once in the insertion position, each of the first and second gripping units 606, 608 may be actuated (e.g. pneumatically actuated by controlling a pneumatic valve connected to a pneumatic line from the junction box 618) to an extraction gripping position. The first gripping unit 606 may for example comprise a pneumatic gripper that can be actuated to grip the masking ring. The pneumatic gripper may for example comprise an internal diameter gripper having fingers that can be actuated outwardly to grab an internal diameter of the masking ring. The second gripping unit 608 may for example comprise a plurality of pneumatically-actuated barbed edges 609 that expand outwards when actuated to grip an interior surface of the electrodeposited metal tube. FIG. 6F, for example, shows the first gripping unit 606 gripping a masking ring 658 of the cell, and the second gripping unit 608 gripping an internal surface of the electrodeposited metal 660 via barbed edges 609.

While the first and second gripping units 606, 608 are in the extraction gripping position, the actuator 612 is configured to move the first and second gripping units to the extracted position, fully removing the masking ring, metal tube, and starter sheet from the cell. FIG. 6F may for example correspond to an intermediary position between the insertion and extracted position while removing the masking ring 658, electrodeposited metal 660, and starter sheet 654 from the cell. Movement of the first gripping unit 606 that is gripping the masking ring results in corresponding movement of the starter sheet. As previously described, the masking ring may also be lockably engaged with the starter sheet (e.g. with a bayonet-style locking mount), thereby further securing the masking ring and the starter sheet. A pneumatic regulator may be used with the actuator 612 to fine tune the lifting force, preventing too little or excessive force (e.g. that may damage the bayonet-style locking mount).

Figure 6G:
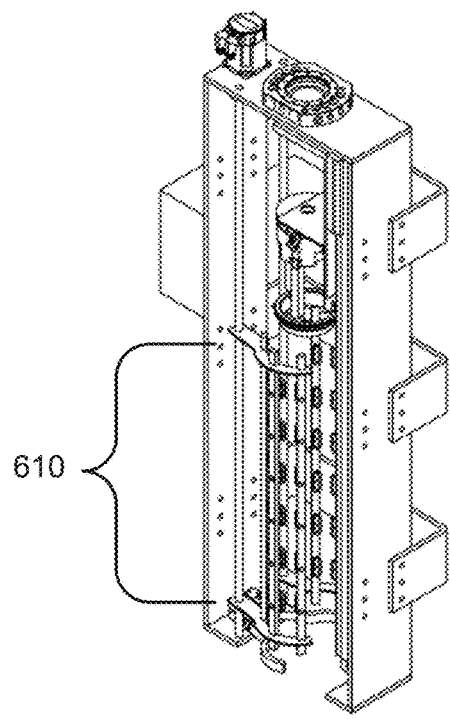
FIGS. 6G-I show details of a harvesting gripping unit in the harvesting tool of FIGS. 6A and 6B.
Figure 6H:
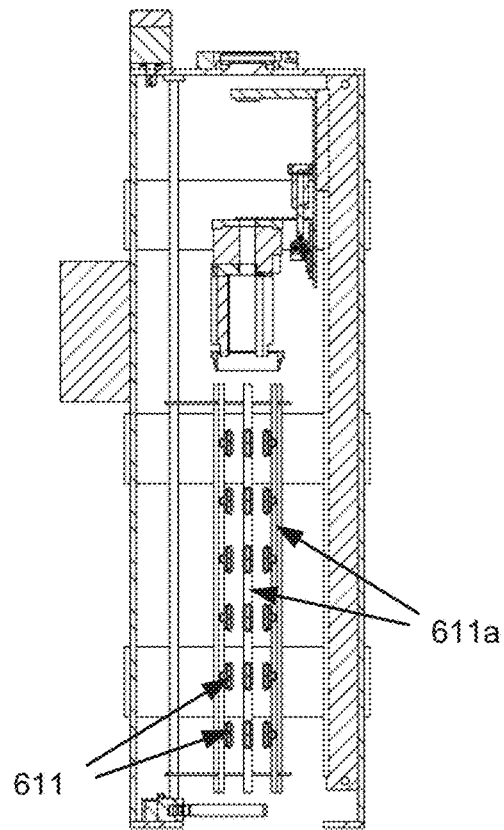
Figure 6I:
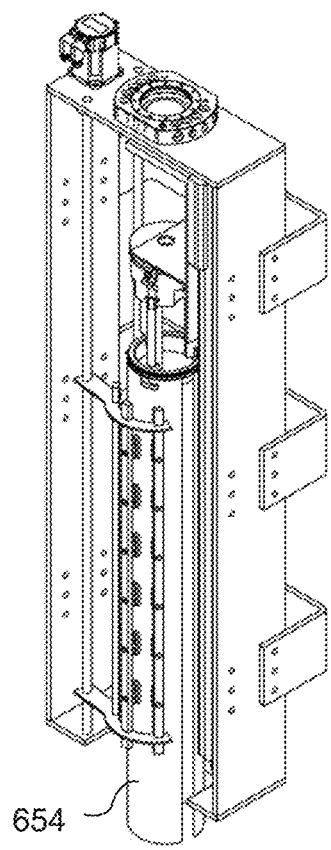

With the extraction gripping unit moved to the extracted position inside the frame 602 of the harvesting tool 600, the harvesting gripping unit, e.g. the third gripping unit 610, is configured to separate the starter sheet from the metal tube to enable harvesting of the metal tube. The third gripping unit 610 may be arranged radially outwardly of the second gripping unit 608. FIGS. 6G and 6H respectively show perspective and frontal views of the harvesting tool 600 shown in FIG. 6B, with the second gripping unit removed to more clearly show the third gripping unit 610. The third gripping unit 610 may for example comprise two or more suction cups 611 arranged on one or more members 611a such that the suction cups 611 are arranged circumferentially around an external surface of the starter sheet when the starter sheet is removed from the cell and the first and second gripping units are in the extracted position. The third gripping unit 610 may be actuated (e.g. pneumatically, or with a servo driven motor 614) to a starter sheet gripping position to grip the external surface of the starter sheet, for example by actuating the members 611a to engage the suction cups 611 with the surface of the starter sheet and creating a negative pressure. The third gripping unit 610 may then be actuated to a separation position that expands the starter sheet radially outwardly by actuating the members 611a radially outwardly with the suction cups 611 engaged with the starter sheet, thereby increasing the diameter of the starter sheet and separating the starter sheet from the metal tube. FIG. 6I shows an example of the third gripping unit being actuated to the separation position to separate the starter sheet 654 from the metal. During this process of separating the starter sheet from the metal, the second gripping unit 608 is still in the extraction gripping position gripping the metal tube.

In order for the third gripping unit 610 to expand the diameter of the starter sheet and thereby separate the starter sheet from the metal tube, in the extracted and gripping position the first gripping unit 606 may first be actuated to separate the masking ring from the starter sheet. In a conventional cell design, the masking ring may simply be pulled off of the starter sheet. However, as previously described, the masking ring and the starter sheet may be lockably engaged in a modified cell design. For example, with reference to the bayonet-style locking mechanism described with reference to FIGS. 2A-D, the first gripping unit 606 may be rotationally actuated to twist the masking ring and pull upwards so as to release the male bayonet 202 from the locking tab 204. In the implementation of the harvesting tool 600 shown in FIG. 6B, the first gripping unit 606, which is coupled to the actuating rod 613, may also be freely rotatable and/or translatable relative to the actuating rod 613, and is thus configured to separate the masking ring from the starter sheet without affecting the second gripping unit 608.

Once the metal tube is separated from the starter sheet, the harvesting tool may be moved to an unloading position and the second gripping unit 608 is actuated to a release position to release the metal tube, thereby placing the metal tube in a desired location in the plant. For example, the gantry structure shown in FIG. 4 may comprise placeholders to temporarily store the metal tube once separated from the starter sheet, before moving the metal tube to an offloading rack.

After successfully harvesting the metal from the starter sheet, the harvesting tool is configured to re-assemble the masking ring and the starter sheet for re-installation in the cell. During manual harvesting, this process is performed by a worker who aligns the starter sheet into the cell and uses body weight to push the sleeve into the cell. The worker then uses a reinsertion tool to firmly place the starter sheet back into the cell, and the masking ring is then placed on top of the starter sheet. With the automated harvesting system, the harvesting tool 600 can be used to reassemble all cells in a repeatable manner. The robotic arm and gantry provide repeatability and accuracy to align the starter sheet and masking ring above the cell. In the robotic harvesting tool 600, the first gripping unit 606 and the third gripping unit 610 may be actuated in concert to reinstall the masking ring onto the starter sheet. The starter sheet and the masking ring may then be re-inserted into the cell by actuating the first gripping unit 606 downwardly into the cell to the insertion position via the actuator 612 (the second gripping unit 608 may also be moved to the insertion position when coupled to the same actuator 612, and prior to reinserting the starter sheet and masking ring into the cell, the second gripping unit 608 may be actuated to grip an interior surface of the starter sheet to provide further support). The first gripping unit 606 may then be actuated to release the masking ring, and is moved out from the cell via the actuator 612.

The starter sheet is generally a sheet material that is rolled when disposed inside the cell. For re-insertion of the starter sheet back into the cell, attachment of the starter sheet to the masking ring at the upper end of the starter sheet may not be sufficient to retain a bottom portion of the starter sheet in a shape that allows for re-insertion. To mitigate this, the harvesting tool 600 may further comprise a clamping apparatus 616 at a bottom portion of the tool that can be actuated (e.g. pneumatically) to reduce a diameter of the starter sheet at a bottom portion thereof to facilitate reinsertion.

The harvesting tool may further comprise other features for facilitating the harvesting process. For example, separation issues between the starter sheet and the metal tube after extraction is sometimes an issue with existing manual processes. During manual harvesting, operators may 'hammer' the sheet with their first or open palm to dislodge the sheet. As described above, the robotic harvesting tool 600 comprises a third gripping unit 610 to separate the starter sheet from the copper. Issues may arise if there is abnormal copper growth and the third gripping unit 610 is unable to overcome the force required for separation. To mitigate this, the harvesting tool 600 may further comprise a force-imparting device such as a hammering/vibration station or device (not shown) to replicate a worker hammering the two sheets. The harvesting tool 600 may be equipped with sensors such as proximity sensors to detect if separation between the starter sheet and metal tube is unsuccessful. The sensors may communicate separation data with the controller, which may in turn trigger the force-imparting device if there is difficulty separating the metal tube from the starter sheet. If separation is still unsuccessful, the gantry and robotic system may move to place the rejected metal and starter sheet (along with the masking ring for that cell) to a reject area.

Locating the starter sheet seam rotationally also helps to facilitate the sheet separation process from the metal tube. As the third gripping unit 610 causes the starter sheet to open up by expanding a diameter of the starter sheet (i.e. unrolling the starter sheet that has been rolled up for insertion into the cell), the third gripping unit 610 should be positioned relative to the starter sheet such that the third gripping unit, when actuated, opens the starter sheet relative to the sheet seam. During reinsertion of the starter sheet into the cell after harvesting the metal, the starter sheet may also be placed into the cell in the same orientation as that from which it was removed to allow for ease of locating this seam during a subsequent harvesting process. The harvesting tool 600 may further comprise a locating sensor (not shown) on the bottom thereof that can be used to locate the seam before extraction of the starter sheet assembly, and to communicate the seam location data to the controller so that the controller can align the third gripping unit 610 relative to the seam. The masking ring may also be modified to have a defining feature which can be used by the robotic harvester sensor to locate the seam.

While the foregoing description of FIGS. 6A-I has described one particular configuration of the harvesting tool and specifically the extraction gripping unit and harvesting gripping unit, a person skilled in the art will appreciate that the harvesting tool is not limited to this specific implementation and that appropriate modifications to the design may be made without departing from the scope of this disclosure.

Figure 7:
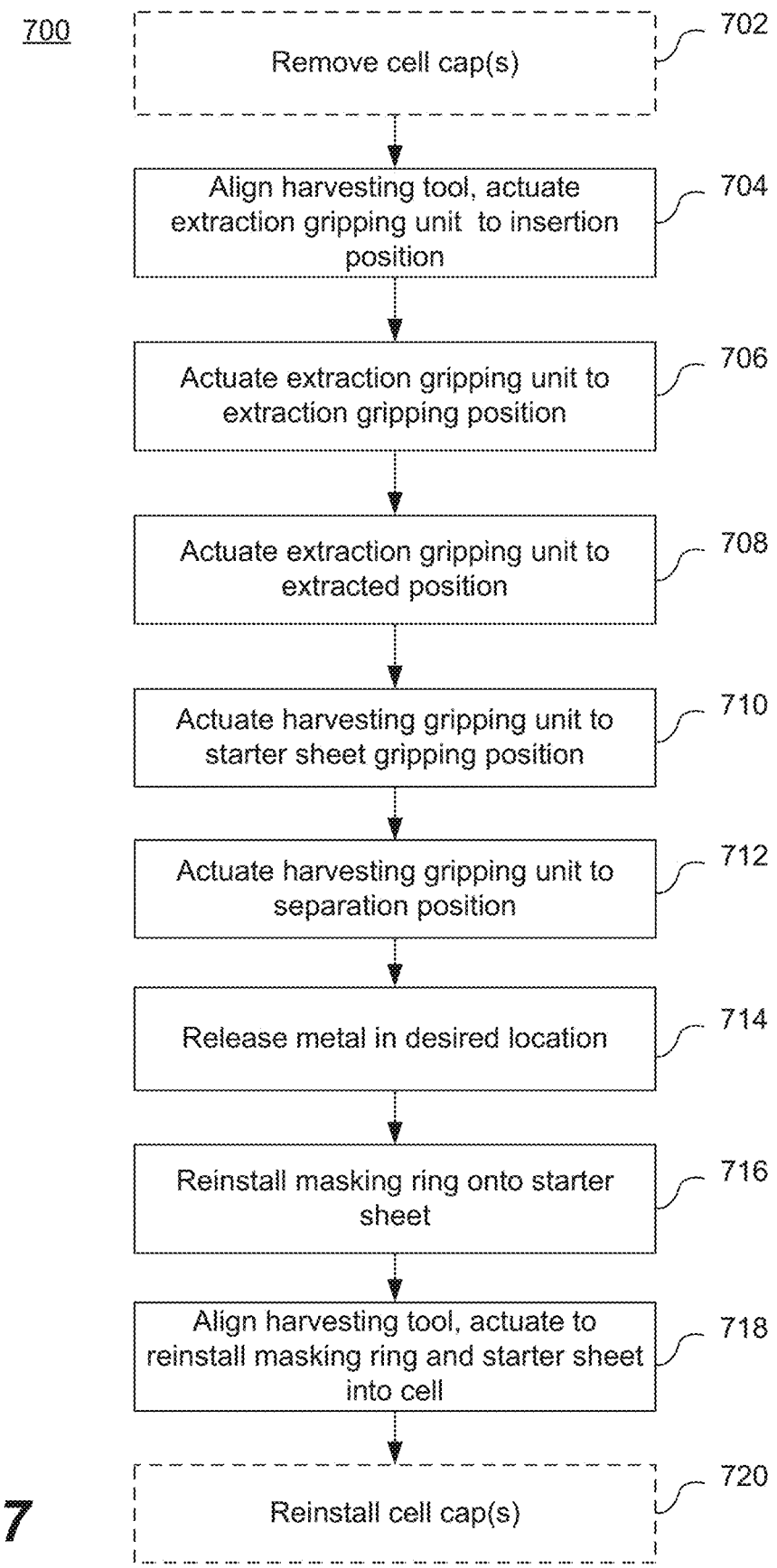
FIG. 7 shows a method of a harvesting process using the automated harvesting system.

FIG. 7 shows a method 700 of a harvesting process using the automated harvesting system. The harvesting process may comprise both harvesting electrodeposited metal from the cell and reinstalling the cell after harvesting the electrodeposited metal. The method 700 may be performed using the automated harvesting system described with reference to FIGS. 3 and 4, and utilizing the cap tool and harvesting tool as described with reference to FIGS. 5 and 6 as robotic end of arm tools.

In the method 700, prior to performing the harvesting using the harvesting tool, the cell cap(s) are removed (702) utilizing, for example, the cap tool installed on the end of the robotic arm. The number of cell caps that are removed (and thus the number of cells to be harvested at a given time) is tied to the overall plant design and procedures, and caps are only removed from cells once the cells have been isolated. A plurality of cell caps may be removed for cells that are to be harvested (e.g. an entire bank/row of 15 cells), thereby minimizing the frequency of switching between robotic tools. The cap tool is then removed from the robotic arm and replaced with the harvesting tool, such as that described with reference to FIGS. 6A and 6B.

The harvesting tool is aligned over the cell to be harvested, and the extracting gripping unit is actuated to an insertion position (704) wherein the extraction gripping unit is inserted to a position inside the cell. For example, as described with reference to FIGS. 6A and 6B, the harvesting tool may comprise a first gripping unit configured to grip the masking ring of the cell, a second gripping unit configured to grip a metal tube electrodeposited on an interior surface of the starter sheet, and at least one actuator coupled to the first and second gripping units for moving the first and second gripping units into the insertion position wherein the first gripping unit engages with the masking ring and the second gripping unit is positioned inside the cell.

While in the insertion position, the extraction gripping unit is actuated to an extraction gripping position (706). For example, with reference to the configuration described with respect to the harvesting tool in FIGS. 6A and 6B, in the extraction gripping position the first gripping unit grips the masking ring and the second gripping unit grips an interior surface of the metal tube. With the extraction gripping unit in the extraction gripping position, the extraction gripping unit is actuated to an extracted position (708), wherein the first and second gripping units are raised from the cell to a position whereby the masking ring, the metal tube, and the starter sheet are removed from the cell, and whereby the harvesting gripping unit is in a position to separate the starter sheet from the metal.

With the extraction gripping unit in the extracted position, the metal tube is separated from the starter sheet by actuating the harvesting gripping unit to the starter sheet gripping position (710), and subsequently actuating the harvesting gripping unit to the separation position (712). For example, as described with reference to FIGS. 6A and 6B, the harvesting gripping unit may comprise the third gripping unit configured to grip the starter sheet and separate the metal from the starter sheet. As also previously described, the first gripping unit may be actuated to release the masking ring from the starter sheet, such as by actuating upwards to pull the masking ring from the starter sheet and/or actuated rotationally to unlock the masking ring from the starter sheet if the masking ring and the starter sheet are lockably engaged. The separated metal may be released in a desired location (714), for example by moving the robotic system and/or gantry to the desired location and actuating the second gripping unit to release the harvested metal.

To reinstall the cell, the masking ring is reinstalled onto the starter sheet (716). For example, the masking ring may be lockably engaged with the starter sheet by using the first and third gripping units in combination. The harvesting tool is aligned with the cell, and actuated to insert the masking ring with the starter sheet installed thereon back into the cell (718). For example, the first gripping unit gripping the masking ring may be actuated to insert the masking ring (and corresponding starter sheet) into the cell. As previously described, a clamping apparatus may also be used to facilitate reinsertion of the starter sheet.

As described above, in (702) a plurality of cell caps may be removed for cells to be harvested. The method in (704)-(718) may be performed for each cell with their cell cap removed. After harvesting the metal from the cells and reinstalling the cells, the cap tool may be reinstalled on the end of the robotic arm, and used to reinstall cell cap(s) for each of the harvested cells (720).

During the harvesting process, the harvested metal may be temporarily placed in an upright position on a holder on the gantry. After harvesting metal tubes from a plurality of cells, the gantry may be moved to an offloading position near an offloading rack. The harvesting tool may be reinstalled onto the end of the robotic arm, and used to place the metal tubes from their location on the gantry to the offloading rack. For example, this operation may be performed by actuating the second gripping unit of the harvesting tool to be inserted inside the metal tube, actuating the second gripping unit to grip the metal tube, moving the metal tube gripped by the second gripping unit to the offloading rack, and releasing the metal tube from the second gripping unit. The metal rack, once loaded with the harvested metals, may be ready for transport.

Figure 8A:
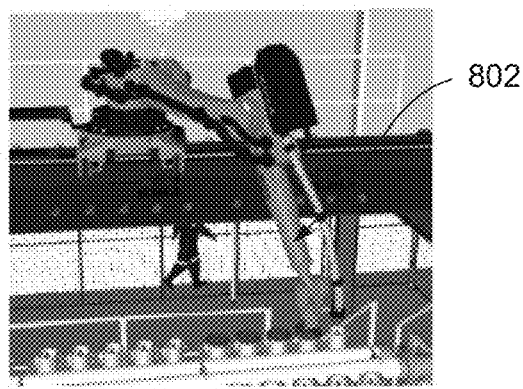
FIGS. 8A-F show examples of the automated harvesting system during different stages of the harvesting process.
Figure 8B:
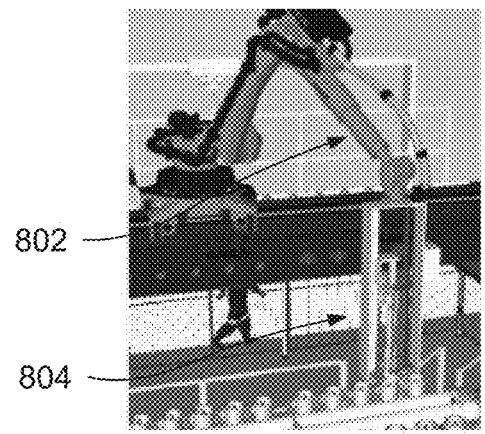
Figure 8C:
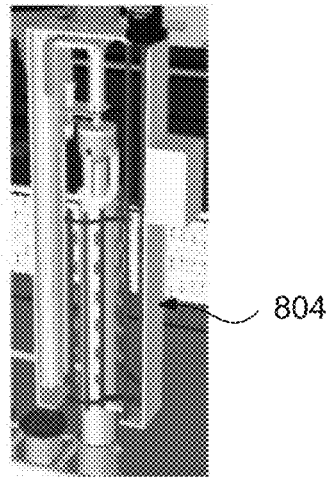
Figure 8D:
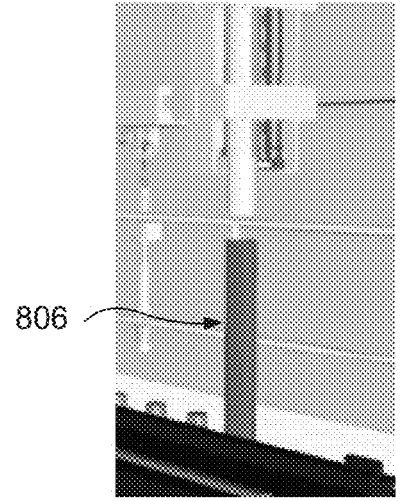
Figure 8E:
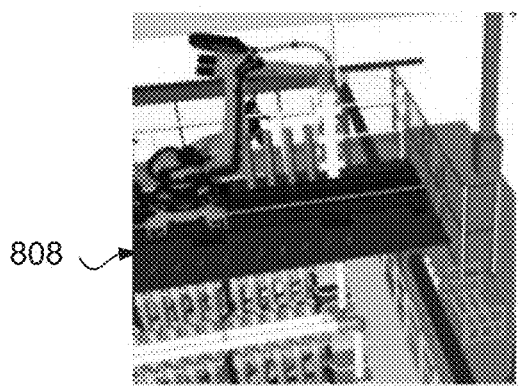
Figure 8F:
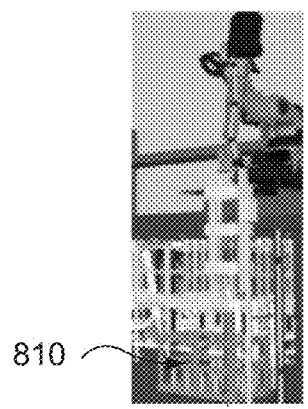

FIGS. 8A-F show examples of the automated harvesting system during different stages of the harvesting process. FIG. 8A shows a representation of removing cell caps using the automated harvesting system with a cap tool installed on the end of the robotic arm 802. FIG. 8B shows a representation of lowering a harvesting tool 804 on the end of the robotic arm 802 into the cell into the insertion position. FIG. 8C shows a representation of raising the harvesting tool 804 into the extracted position with the masking ring, starter sheet, and metal tube from the cell. FIG. 8D shows a representation of placing the harvested metal tube 806 on an appropriate holder located on the gantry. FIG. 8E shows a representation of the gantry 808 moving to a metal offloading position. FIG. 8F shows a representation of the robotic system placing the metal into an offloading rack 810.

It would be appreciated by one of ordinary skill in the art that the system and components shown in the figures may include components not shown in the drawings. For simplicity and clarity of the illustration, elements in the figures are not necessarily to scale, are only schematic and are non-limiting of the element structures. It will be apparent to persons skilled in the art that a number of variations and modifications can be made without departing from the scope of the invention as described herein.

The invention claimed is:

1. A harvesting tool for harvesting electrodeposited metals from a cell comprising a tubular cell wall, an anode extending in an axial direction of the cell and disposed centrally within the cell with respect to a radial direction of the cell, a removable starter sheet disposed along an inner surface of the cell wall, and a masking ring arranged on top of the starter sheet, the harvesting tool comprising:
 an extraction gripping unit configured to extract the starter sheet and metal electrodeposited on an interior surface of the starter sheet from the cell;
 a harvesting gripping unit configured to separate the metal and the starter sheet;
 a first actuator coupled to the extraction gripping unit, configured to move the extraction gripping unit between:
  an insertion position, wherein the extraction gripping unit is inserted to a position inside the cell, and
  an extracted position, wherein the extraction gripping unit is positioned outside the cell;
 a second actuator coupled to the harvesting gripping unit, configured to move the harvesting gripping unit between:
  a starter sheet gripping position, wherein the harvesting gripping unit is configured to grip the starter sheet, and
  a separation position, wherein the starter sheet is separated from the metal; and
 a clamping apparatus configured to be actuated to reduce a diameter of the starter sheet for reinsertion of the starter sheet into the cell.

2. The harvesting tool of claim 1, wherein the extraction gripping unit is actuatable to an extraction gripping position to grip at least one of the masking ring of the cell, and the metal electrodeposited on the starter sheet.

3. The harvesting tool of claim 2, wherein the extraction gripping unit comprises:
 a first gripping unit configured to grip the masking ring of the cell; and
 a second gripping unit configured to grip the metal,
 wherein in the insertion position, the first gripping unit is inserted to a position of the masking ring, and the second gripping unit is positioned inside the cell between the anode and the metal.

4. The harvesting tool of claim 3, wherein the first gripping unit is actuatable to a first extraction gripping position to grip the masking ring.

5. The harvesting tool of claim 4, wherein the first gripping unit comprises an internal diameter gripper having fingers that can be actuated outwardly to grip an internal diameter of the masking ring.

6. The harvesting tool of claim 5, wherein the masking ring is rotationally locked with the starter sheet, and wherein the harvesting tool further comprises a rotational actuator coupled to the first gripping unit and configured to rotate the first gripping unit in the first gripping position to separate the masking ring from the starter sheet.

7. The harvesting tool of claim 3, wherein the second gripping unit is actuatable to a second extraction gripping position to grip an inner surface of the metal.

8. The harvesting tool of claim 7, wherein the second gripping unit comprises a plurality of pneumatically-actuated barbed edges that expand outwards when actuated to grip the inner surface of the metal.

9. The harvesting tool of claim 1, wherein the harvesting gripping unit comprises two or more suction cups arranged circumferentially around an external surface of the starter sheet when the starter sheet is removed from the cell and the extraction gripping unit is in the extracted position, and wherein the two or more suction cups are actuatable between the starter sheet gripping position and the separation position.

10. The harvesting tool of claim 1, further comprising a force-imparting device actuatable to impart a force to the starter sheet to facilitate separation of the starter sheet from the metal.

11. The harvesting tool of claim 10, further comprising a sensor configured to detect the separation of the starter sheet from the metal and to communicate separation data recorded by the sensor.

12. The harvesting tool of claim 1, further comprising a locating sensor configured to locate a seam of the starter sheet prior to removal of the starter sheet from the cell, and to communicate seam location data recorded by the sensor, wherein the seam location data is used to align the harvesting gripping unit relative to the seam.

13. The harvesting tool of claim 1, wherein the first actuator is configured to move the extraction gripping unit in the axial direction of the cell between the insertion position and the extracted position.

14. The harvesting tool of claim 1, wherein the second actuator is configured to move the harvesting gripping unit in the radial direction of the cell between the starter sheet gripping position and the separation position.

15. The harvesting tool of claim 1, further comprising a tool changer for coupling to a robotic arm.

16. A harvesting system for harvesting electrodeposited metals from a cell comprising a tubular cell wall, an anode extending in an axial direction of the cell and disposed centrally within the cell with respect to a radial direction of the cell, a removable starter sheet disposed along an inner surface of the cell wall, and a masking ring arranged on top of the starter sheet, the harvesting system comprising:
 a harvesting tool, comprising:
  an extraction gripping unit configured to extract the starter sheet and metal electrodeposited on an interior surface of the starter sheet from the cell;
  a harvesting gripping unit configured to separate the metal and the starter sheet;

a first actuator coupled to the extraction gripping unit, configured to move the extraction gripping unit between:
   an insertion position, wherein the extraction gripping unit is inserted to a position inside the cell, and
   an extracted position, wherein the extraction gripping unit is positioned outside the cell; and
a second actuator coupled to the harvesting gripping unit, configured to move the harvesting gripping unit between:
   a starter sheet gripping position, wherein the harvesting gripping unit is configured to grip the starter sheet, and
   a separation position, wherein the starter sheet is separated from the metal;
a robotic arm configured to couple to the harvesting tool; and
a controller configured to control movement of the robotic arm and to control actuation of the harvesting tool.

17. The harvesting system of claim 16, further comprising:
a gantry extending in a first direction and configured to travel linearly in a second direction perpendicular to the first direction, the gantry comprising a robotic track arranged thereon; and
a robotic slide unit arranged on the robotic track of the gantry and configured to travel along the robotic track in the first direction;
wherein the robotic arm is arranged on the robotic slide unit.

18. The harvesting system of claim 16, further comprising a cap tool configured to be coupled to the robotic arm, the cap tool comprising a cap gripping unit configured to grip a cell cap of the cell, and wherein the robotic arm is configured to rotate the cap tool to remove and reinstall the cell cap.

19. A method of harvesting electrodeposited metal from a cell, the cell comprising a tubular cell wall, an anode extending in an axial direction of the cell and disposed centrally within the cell with respect to a radial direction of the cell, a removable starter sheet disposed along an inner surface of the cell wall, and a masking ring arranged on top of the starter sheet, the method comprising:
aligning a harvesting tool over the cell, the harvesting tool comprising:
   an extraction gripping unit configured to extract the starter sheet and metal electrodeposited on an interior surface of the starter sheet from the cell;
   a harvesting gripping unit configured to separate the metal and the starter sheet;
   a first actuator coupled to the extraction gripping unit, configured to move the extraction gripping unit between:
      an insertion position, wherein the extraction gripping unit is inserted to a position inside the cell, and
      an extracted position, wherein the extraction gripping unit is positioned outside the cell;
   a second actuator coupled to the harvesting gripping unit, configured to move the harvesting gripping unit between:
      a starter sheet gripping position, wherein the harvesting gripping unit is configured to grip the starter sheet, and
      a separation position, wherein the starter sheet is separated from the metal; and
   a clamping apparatus configured to be actuated to reduce a diameter of the starter sheet for reinsertion of the starter into the cell;
actuating the extraction gripping unit to the insertion position;
actuating the extraction gripping unit to an extraction gripping position to grip at least one of the masking ring of the cell, and the metal electrodeposited on the starter sheet;
with the extraction gripping unit in the extraction gripping position, actuating the extraction gripping unit to the extracted position, wherein the extraction gripping unit is positioned outside the cell and the masking ring, the metal, and the starter sheet are removed from the cell; and
with the extraction gripping unit in the extracted position, actuating the harvesting gripping unit to the starter sheet gripping position to grip the starter sheet, and subsequently actuating the harvesting gripping unit to the separation position, to separate the metal from the starter sheet.

* * * * *